ary Examiner—Shrive P. Beck
Attorney, Agent, or Firm—Myron B. Kapustij; William F. Mufatti

United States Patent [19]

Schroeter et al.

[11] 4,224,378
[45] Sep. 23, 1980

[54] ABRASION RESISTANT ORGANOPOLYSILOXANE COATED POLYCARBONATE ARTICLE

[75] Inventors: Siegfried H. Schroeter, Schenectady; Daniel R. Olson, Clifton Park, both of N.Y.

[73] Assignee: General Electric Company, Pittsfield, Mass.

[21] Appl. No.: 956,810

[22] Filed: Nov. 1, 1978

[51] Int. Cl.$^3$ .............................................. B32B 27/36
[52] U.S. Cl. .................................. 428/412; 428/447; 428/448; 428/451; 428/500
[58] Field of Search ............... 428/412, 447, 448, 451, 428/500

[56] References Cited

U.S. PATENT DOCUMENTS

| | | | |
|---|---|---|---|
| 2,976,184 | 3/1961 | Blatz | 427/385 |
| 3,379,607 | 4/1968 | Foster et al. | 428/500 |
| 3,451,838 | 6/1969 | Burzynski et al. | 427/385 |
| 3,488,215 | 1/1970 | Shepherd et al. | 427/385 |
| 3,582,398 | 6/1971 | Ringler | 428/412 |
| 3,637,416 | 1/1972 | Misch et al. | 428/412 |
| 3,661,685 | 5/1972 | Osteen | 428/412 |
| 3,701,753 | 10/1972 | Shaw | 428/447 X |
| 3,707,397 | 12/1972 | Gagnon | 428/447 X |
| 3,865,619 | 2/1975 | Pennewiss | 428/412 X |
| 3,953,115 | 4/1976 | French et al. | 428/412 X |
| 3,968,305 | 7/1976 | Oshima et al. | 428/412 |
| 3,968,309 | 7/1976 | Matsuo et al. | 428/522 |
| 3,978,178 | 8/1976 | Oshima et al. | 264/25 |
| 3,986,997 | 10/1976 | Clark | 260/29.2 M |
| 4,026,826 | 5/1977 | Yoshida et al. | 260/25 |
| 4,027,073 | 5/1977 | Clark | 428/412 |
| 4,028,300 | 6/1977 | Wake et al. | 428/451 |
| 4,041,120 | 8/1977 | Oshima et al. | 428/412 |
| 4,045,602 | 8/1977 | Sommer et al. | 427/386 |
| 4,064,286 | 12/1977 | Hahn | 427/386 |
| 4,080,476 | 3/1978 | Laskey | 428/412 X |
| 4,103,065 | 7/1978 | Gagnon | 428/451 X |
| 4,159,206 | 6/1979 | Armbruster et al. | 428/447 |

Primary Examiner—Shrive P. Beck
Attorney, Agent, or Firm—Myron B. Kapustij; William F. Mufatti

[57] ABSTRACT

A coated polycarbonate article, and a process for producing said article, having improved abrasion and chemical solvent resistance comprising a polycarbonate substrate having deposited thereon (i) a primer layer comprised of a thermoplastic acrylic polymer; and (ii) a top coat containing a thermoset organopolysiloxane disposed on said primer layer. The process for producing said coated polycarbonate article comprises (i) priming the surface of a polycarbonate substrate with a thermoplastic acrylic polymer by forming a thin film of said thermoplastic acrylic polymer on the surface of said substrate, (ii) applying a top coating composition containing a further curable organopolysiloxane onto the primed substrate, and (iii) curing the further curable organopolysiloxane to form a hard, abrasion and chemical solvent resistant top coat which is tenaciously adhered to the polycarbonate substrate.

19 Claims, No Drawings

ABRASION RESISTANT ORGANOPOLYSILOXANE COATED POLYCARBONATE ARTICLE

This invention relates to abrasion and chemical solvent resistant organopolysiloxane coated polycarbonate articles wherein the organopolysiloxane top coat is tenaciously adhered to the polycarbonate substrate and to a process for producing such an article. More particularly, the present invention relates to an organopolysiloxane coated polycarbonate article having a primer layer between the polycarbonate and the organopolysiloxane top coat comprising a thermoplastic acrylic polymer. The process for producing said article comprises priming the polycarbonate substrate with an adhesion promoting, thermoplastic acrylic polymer by forming a thin film of said thermoplastic acrylic polymer on the polycarbonate article thereon; coating the primed surface with a further curable organopolysiloxane containing top coat composition; and curing the further curable organopolysiloxane to form an adherent, abrasion and chemical solvent resistant top coat.

BACKGROUND OF THE INVENTION

The use of transparent glazing materials utilizing polycarbonate resin as a structural component for windows, windshields and the like are well known. While these polycarbonate resins are easily fabricated into the desired shape and have excellent physical and chemical properties, such as being less dense than glass and having more breakage resistance than glass, their abrasion resistance and chemical solvent resistance is relatively low.

In order to overcome this relatively low scratch and mar resistance and to otherwise improve the surface characteristics of the molded substrate, various coatings have been applied to the polycarbonate resins. U.S. Pat. No. 3,582,398 describes a fabricated polycarbonate part having improved optical properties consisting of a polycarbonate substrate and a transparent coating thereon of a thermoplastic polymethyl-methacrylate. Additionally U.S. Pat. No. 4,061,652 describes a coating for polycarbonates comprised of (i) an acrylic resin which is a mixture of olefinically unsaturated organic monomers in combination with an acrylic polymer; and (ii) certain urethanes of hydroxybenzotriazoles and hydroxybenzophenones in combination with certain catalysts. U.S. Pat. Nos. 3,451,838, 3,986,997 and 4,027,073 disclose organopolysiloxane coating compositions and techniques for the application of these organopolysiloxane coatings onto polycarbonate surfaces. While these coatings have many desirable properties, e.g., they are hard, abrasion resistant, and chemical solvent resistant, these organopolysiloxane coatings do not in all instances possess the requisite degree of uniform adherence to and durability on these polycarbonate surfaces. U.S. Pat. No. 3,707,397 describes a process for providing a hard coating on, inter alia, polycarbonate articles, said process including priming the polycarbonate surface with an adhesion promoting thermosettable acrylic and applying an organopolysiloxane onto the primed surface. An article produced by this process, while possessing acceptable initial adherence of the organopolysiloxane to the substrate, suffers from the disadvantage that upon prolonged exposure to weathering, and particularly to sunlight, the organopolysiloxane generally tends to lose its initial adherence to the substrate. Furthermore, as the thickness of the thermoset acrylic primer layer increases, the abrasion resistance of the coated article generally decreases. There thus remains a need for non-opaque polycarbonate articles having uniformly, tenaciously and durably adhered abrasion and chemical resistant coatings thereon, and it is a primary object of the present invention to provide such articles and a relatively simple and economical process for producing these articles.

DESCRIPTION OF THE INVENTION

This invention relates to non-opaque organopolysiloxane coated polycarbonate articles having a thermoplastic acrylic polymer adhesion promoting primer layer disposed between the polycarbonate substrate and the organopolysiloxane coating and to a process for producing these articles.

In the practice of the present invention, prior to the application of the organopolysiloxane coating to the polycarbonate surface, the surface is first primed by the application thereto of a primer composition containing a thermoplastic acrylic polymer and then the organopolysiloxane coating is applied thereon.

The aromatic carbonate polymer of the instant invention has recurring units of the formula:

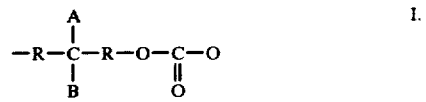

wherein each —R— is selected from the group consisting of phenylene, halo-substituted phenylene and alkyl substituted phenylene; and A and B are each selected from the group consisting of hydrogen, hydrocarbon radicals free from aliphatic unsaturation and of radicals which together with the adjoining

atom form a cycloalkane radical, the total number of carbon atoms in A and B being up to 12.

The aromatic carbonate polymer of this invention may be prepared by methods well known in the art and as described in U.S. Pat. No. 3,989,672 all of which are incorporated by reference.

Also, included herein are branched polycarbonates wherein a polyfunctional aromatic compound is reacted with the dihydric phenol and carbonate precursor to provide a thermoplastic randomly branched polycarbonate wherein the recurring units of formula I. contain branching groups.

The preferred polycarbonate resins may be derived from the reaction of bisphenol-A and phosgene. These polycarbonates have from 10–400 recurring units of the formula:

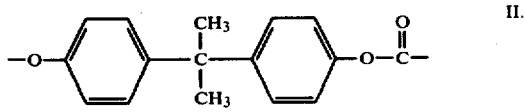

The polycarbonate should have an intrinsic viscosity between 0.3 and 1.0, preferably from 0.40 to 0.65 as measured at 25° C. in methylene chloride.

The thermoplastic acrylic polymers which are employed in the priming material in accordance with this invention are those thermoplastic acrylic polymers well known in the art as thermoplastic acrylic polymers. Exemplary thermoplastic acrylic polymers employed in the practice of this invention are set forth, for example, in *Encyclopedia of Polymer Science and Technology,* Vol. 1, Interscience Publishers, John Wiley & Sons, Inc., copyright 1964, at p. 246 et seq. and the reference cited therein, all of which are hereby incorporated by reference.

The term "thermoplastic acrylic polymers" as used herein is meant to embrace within its scope these thermoplastic polymers resulting from the polymerization of one or more acrylic acid ester monomers as well as methacrylic acid ester monomers. These monomers are represented by the general formula $$CH_2=CYCOOR^1 \qquad \text{III.}$$

wherein Y is H or a methyl radical and $R^1$ is an alkyl radical, preferably one containing from 1 to about 20 carbon atoms.

Examples of alkyl groups represented by $R^1$ in general formula III include methyl, ethyl, n-propyl, isopropyl, n-butyl, isobutyl, sec-butyl, tert-butyl, isobutyl, n-amyl and the various positional isomers thereof, and likewise the corresponding straight and branched chain isomers of hexyl, heptyl, octyl, nonyl, decyl and the like.

Exemplary acrylic acid ester monomers represented by formula III include methyl acrylate, isopropyl acrylate, n-propyl acrylate, n-butyl acrylate, isobutyl acrylate, sec-butyl acrylate, 2-ethylhexyl acrylate, etc. Exemplary methacrylic acid ester monomers represented by formula III include methyl methacrylate, ethyl methacrylate, n-butyl methacrylate, isobutyl methacrylate, hexyl methacrylate, etc. Copolymers of the above acrylic acid ester and/or methacrylic acid ester monomers are also included within the term "thermoplastic acrylic polymers" as it appears herein. The polymerization of the monomeric acrylic acid esters and methacrylic acid esters to provide the thermoplastic acrylic polymers useful in the practice of the invention may be accomplished by any of the well known polymerization techniques. The thermoplastic acrylic polymers having a molecular weight of at least about 15,000 generally are preferred in the practice of the instant invention.

The thermoplastic acrylic polymers useful in the practice of the instant invention include acrylic ester homopolymers derived from acrylic acid ester monomers; methacrylic ester homopolymers derived from methacrylic acid ester monomers; and copolymers derived from two different acrylic acid ester monomers, two different methacrylic acid ester monomers, or an acrylic acid ester monomer and a methacrylic acid ester monomer.

Mixtures of two or more of the aforedescribed thermoplastic acrylic polymers, e.g., two or more different acrylic ester homopolymers, two or more different acrylic ester copolymers, two or more different methacrylic ester homopolymers, two or more different methacrylic ester copolymers, an acrylic ester homopolymer and a methacrylic ester homopolymer, an acrylic ester copolymer and an acrylic ester copolymer, an acrylic ester homopolymer and a methacrylic ester copolymer, etc., can also be used in the present invention.

The thermoplastic acrylic polymers are in general applied as primers from a primer composition containing said thermoplastic acrylic polymer and a volatile solvent, either organic or inorganic in nature, which is generally substantially inert, i.e., will not too adversely affect the polycarbonate part to be treated, but which is capable of dissolving the thermoplastic acrylic polymers. Generally, the concentration of the thermoplastic acrylic polymer in the priming composition ranges from about 0.5 to about 25 percent by weight, preferably from about 1 to about 15 percent by weight. Examples of suitable solvents include ethylene glycol diacetate, butoxyethanol, methylenedichloride, 1,2-dichloroethylene, chloroform, benzene and toluene.

The primer compositions of the instant invention may also optionally contain various flatting agents, ultraviolet light absorbent agents, surface active agents and thixotropic agents. All of these additives and the use thereof are well known in the art and do not require extensive discussions. Therefore, only a limited number will be referred to, it being understood that any compounds possessing the ability to function in such a manner, i.e., as a flatting agent, surface active agent, and ultraviolet light absorbent agents can be used.

The various surface-active agents, including anionic, cationic and nonionic surface-active agents are described in *Kirk-Othmer Encyclopedia of Chemical Technology,* Vol. 19, Interscience Publishers, New York, 1969, pp. 507–593, and *Encyclopedia of Polymer Science and Technology,* Vol. 13, Interscience Publishers, New York, 1960, pp. 477–486, both of which are references and incorporated herein.

Exemplary ultraviolet light absorbent compounds or stabilizers include those of the hydroxy benzophenone or benzotriazole series. Examples of these are: 2-hydroxy-4-n-octoxybenzophenone, substituted hydroxyphenylbenzotriazole, 2-(2'-hydroxy-5'-methylphenyl)-benzotriazole, and 2-hydroxy-4-methoxybenzophenone. Further examples of ultraviolet light absorbers which may be used in the practice of this invention may be found in U.S. Pat. No. 3,043,709. In general, the amount of the ultraviolet light absorber may vary from about 0.5 to about 15 percent by weight based upon the weight of the priming composition.

A uniform film of the primer composition is applied onto the polycarbonate surface by any of the known means such as dipping, spraying, roll-coating and the like. After the formed polycarbonate part is coated with the primer composition, the inert volatile solvent may be removed by drying the coated article until the volatile solvent evaporates, leaving a primer layer of coating containing the thermoplastic acrylic polymer on the polycarbonate surface to which the primer composition was applied. The drying operation may be hastened by the use of drying apparatus such as, for example, a drying oven. Generally, the primer layer is a uniform film having a thickness varying between about 0.002 mil to about 1 mil, preferably between about 0.01 mil to about 0.5 mil.

After the polycarbonate article has been primed by the application thereon of the primer composition and the evaporation of the solvent from the primer composition, a top coat composition containing a further-curable organopolysiloxane is applied onto the primed polycarbonate substrate.

The further-curable organopolysiloxane is the partial hydrolysis and condensation product of at least one compound represented by the general formula $$R^2{}_n SiZ_{(4-n)} \qquad \text{IV.}$$

wherein $R^2$ represents a monovalent hydrocarbon radical and a halogenated monovalent hydrocarbon radical, Z represents a hydrolyzable group, and n may vary between 0 and 2.

More specifically, Z is independently a member such as halogen, alkoxy, acyloxy, and aryloxy.

Preferably, $R^2$ represents an alkyl radical containing from 1 to about 8 carbon atoms such as methyl, ethyl, and propyl through octyl (both normal and isomeric), an alkenyl radical containing from 2 to about 8 carbon atoms, such as vinyl and the normal and isomeric forms of propenyl through octenyl, and the phenyl radical; Z preferably represents an alkoxy radical containing from 1 to about 8 carbon atoms such as methoxy, ethoxy, propoxy, heptoxy, octoxy and the like, an acyloxy radical containing from 2 to about 9 carbon atoms, such as acetoxy, propionoxy, butyroxy, pentanoxy, hexanoxy and the like, and a phenoxy radical; and n varies from 0 to 2.

Preferred compounds of formula IV are silanes of the formula $$R^3{}_a Si(OR^4)_{4-a} \qquad \text{V.}$$

and silanes of the formula $$R^5{}_b Si(OCOR^6)_{4-b} \qquad \text{VI.}$$

wherein $R^3$ and $R^5$ represent a monovalent hydrocarbon radical and a halogenated monovalent hydrocarbon radical, preferably an alkyl radical containing from 1 to about 8 carbon atoms, an alkenyl radical containing from 2 to about 8 carbon atoms, and the phenyl radical; $R^4$ and $R^6$ represent monovalent hydrocarbon radicals and halogenated monovalent radicals such as alkyl radicals and phenyl radicals, but are preferably alkyl radicals of 1 to 8 carbon atoms; a is 0 or 1; and b varies from 0 to 2.

Upon hydrolysis, the compounds of formula IV and more specifically those of formulas V and VI are converted to the corresponding silanols. Upon generation of the silanol, there is condensation of the hydroxyl substituents to form —Si—O—Si— bonding. The condensation is not complete, but rather the organopolysiloxane retains a quantity of silicon-bonded hydroxyl groups. This partial condensate can be characterized as a further-curable, i.e., further condensable, siloxanol polymer. During curing of the further-curable organopolysiloxane which has been deposited on the primed polycarbonate substrate, then residual hydroxyls condense to give a silsesquioxane, $R^7 SiO_{3/2}$, wherein $R^7$ represents $R^2$, $R^3$ or $R^5$ above.

The further-curable organopolysiloxane may be formulated into the top-coat composition as a solution of the siloxanol polymer in water and alcohol by-product, and as a concentrated solution of siloxanol in water and alcohol by-product by evaporating off a substantial quantity of the alcohol by-product and water, or it may be formulated into the top-coat composition as a solid partially pre-cured product by evaporating off a substantial amount of alcohol by-product and water and then partially precuring and solidifying the concentrated product.

Examples of good silicone top coats are the foregoing alkoxy and aryloxy functional silanes represented by formula V and acyloxy functional silanes represented by formula VI. Such alkoxy functional, aryloxy functional and acyloxy functional silanes are well known materials to silicone manufacturers and are easily obtainable. With respect to the acyloxy functional silanes, these materials are generally applied without any solvent since it has been found that the use of solvents in application of such top coat at times seriously degrades the applied silicone top coat. Preferably, the silanes of formula VI, that is the acyloxy functional silanes, are applied at 100% solids or from 20 to 100% solids. In the case of the acyloxy silanes where the solids are less than 100% the silane is simply the water hydrolysis and partial condensation product of the foregoing acyloxy functional silanes of formula VI. The alkoxy and aryloxy functional silanes of formula V are generally applied from a top-coat composition containing solvents in a concentration of from about 20 to 95% by weight. Examples of solvents which may be used in the formulation of the top-coat composition include methanol, ethanol, butanol, ethyl acetate, benzene, toluene, xylene, ethylene glycol and the like. However, the alkoxy and aryloxy functional silanes may also, similarly to the acyloxy functional silanes, be applied from a top-coat composition which contains no solvents other than the alcohol by-product and water used to form the partial hydrolysis and condensation products of these silanes.

With respect to the foregoing aryloxy functional, alkoxy functional and acyloxy functional silanes mentioned above, such materials are well known in the art as, for instance, in U.S. Pat. Nos. 3,888,815 and 3,701,753, both of which are incorporated herein by reference.

One particular class of further-curable organopolysiloxanes which are employed in the top-coat compositions of the present invention are the partial hydrolysis and condensation products of alkoxy functional silanes, preferably alkyltrialkoxysilanes, preferably those alkyltrialkoxysilanes wherein the alkyl group contains from 1 to about 8 carbon atoms, and aryltrialkoxysilanes, preferably phenyltrialkoxysilanes, or mixtures thereof, wherein the alkoxy group contains from 1 to about 8 carbon atoms, such as, for example, methoxy, ethoxy, isopropoxy, butoxy, pentoxy, hexoxy, octoxy, and the like. These further-curable organopolysiloxanes are generally prepared by a process wherein the alkyltrialkoxysilane and aryltrialkoxysilane is heated in the presence of water, wherein the molar ratio of water to total silane is at least about 1.5:1 and in the presence of an effective amount of a hydrolysis catalyst, such as a mineral acid, for example, HCl, for about 1 to about 10 hours at a temperature between ambient and reflux to product a siloxane partial condensation product; the partial condensation product is then concentrated by heating to remove 50 to about 90 mole percent alkanol by-product and some water, and thereafter, the concentrated partial condensation product is precured by heating at a temperature below the gel point thereof and generally in the range of about 70° to 300° C. to produce the solvent-soluble, further curable organopolysiloxane. This precured solvent-soluble, further-curable organopolysiloxane is then dissolved in a suitable solvent to form the top-coat composition and the primed polycarbonate substrate is then coated with this top coat composition. The solvent is then evaporated and the residual further-curable organopolysiloxane is cured to a thermoset state to provide a uniformly and tenaciously adhered top coat on the primed polycarbonate substrate. The curing is effected at elevated temperatures in the range of about 50° to 135° C. for times between about 1 hour to about 72 hours, depending on the temperature at which the cure is effected. The silicone top coat generally should be cured preferably at an elevated temperature to effect the proper cure but the temperature should be below the glass transition temperature of the polycarbonate. Of course, if the glass transition temperature of the polycarbonate is exceeded then the polycarbonate part may become deformed and lost its utility.

One particular further-curable organopolysiloxane that can be employed in the top coat composition of the instant invention is the partial hydrolysis and condensation product of methyltriethoxysilane. This further-curable organopolysiloxane is prepared by hydrolyzing methyltriethoxysilane with water in the presence of an effective amount of a hydrolysis catalyst, such as HCl, for about 1 to 10 hours at a temperature generally between 40° C. and reflux temperature, to produce a partial condensation product. This partial condensation product is then concentrated by heating to remove some of the alkanol by-product and water. This concentrated product is then partially pre-cured at a temperature of about 70° to about 300° C. and below the gel point thereof and then solidified to provide a solid, solvent-soluble, further-curable organopolysiloxane is then dissolved to a desired concentration in a suitable solvent to form the top coat composition. The top coat composition is then applied to the primed polycarbonate substrate, after which the solvent is evaporated and the further-curable organopolysiloxane finally cured to provide a hard, abrasion and chemical solvent resistant, thermoset organopolysiloxane top coat on the polycarbonate substrate.

Another further-curable organopolysiloxane which may be employed in the practice of the present invention is the partial hydrolysis and condensation product of a mixture of methyltriethoxysilane and phenyltriethoxysilane. This organopolysiloxane is prepared by hydrolyzing a mixture of methyltriethoxysilane and phenyltriethoxysilane with water in the presence of a hydrolysis catalyst such as HCl to produce a partial condensation product. This partial condensation product is then concentrated by heating to remove a substantial amount of the alkanol by-product and some water. This concentrated product is then partially pre-cured by heating and then solidified to provide a solid, solvent-soluble, further-curable organopolysiloxane. The solid, solvent-soluble, further-curable organopolysiloxane is then dissolved to a desired concentration in a suitable solvent to form the top-coat composition containing a further-curable organopolysiloxane. The top-coat composition is then applied to the primed polycarbonate substrate, after which the solvent is evaporated and the further-curable organopolysiloxane is finally cured to provide a tenaciously and durably adhered, abrasion and chemical resistant thermoset organopolysiloxane top coat on the polycarbonate substrate.

These are not the only silicones that may be utilized in the top-coats of the instant invention. Less preferred silicones which can be partially hydrolyzed and condensed or dissolved in a solvent are, for instance, silicone resins composed of trifunctional and difunctional units, silicone resins composed of trifunctional units, difunctional units and tetrafunctional units where the organo substituent groups in the trifunctional units may be selected from hydrocarbon radicals of 1 to about 8 carbon atoms and are preferably methyl, phenyl and vinyl; and wherein the organo substituent groups in the difunctional siloxy units may be selected from hydrocarbon units of from 1 to about 8 carbon atoms, preferably alkyl radicals, vinyl radicals and phenyl radicals. Such silicone resins usually have an organic to silicon atom ratio of 1:1 to 1.9:1, may have a silanol content that varies anywhere from 4 to 10 weight percent and optionally may have an alkoxy content that varies from 2 to 4%. The preparation of such silicone resins which may be utilized as top-coats in the invention of the instant case are, for instance, to be found in U.S. Pat. Nos. 3,375,223, 3,435,001, 3,450,672, 3,790,527, 3,832,319, 3,865,766, 3,887,514 and 3,925,276.

These silicones may also contain fillers such as, for example, glass, talc, and silica, preferably colloidal silica.

The top-coat compositions containing the aforedescribed silicones are simply brushed, dipped, sprayed or flowed on top of the primer layer that is applied to the polycarbonate substrate. The solvent, or alcohol by-product and water, present in the top-coat composition is evaporated and the residual further-curable organopolysiloxane is cured to form a thermoset organopolysiloxane top coat. Preferably, the further-curable organopolysiloxane is cured at elevated temperatures. Although certain catalysts may be utilized to accelerate the cure of the further-curable organopolysiloxane, such catalysts are not necessary if the further-curable organopolysiloxane is cured by itself at the elevated temperature for a sufficient length of time.

Another embodiment of the present invention is a process of producing a durably adherent, mar and chemical resistant silicone coating on a polycarbonate article. The process comprises the steps of: (i) applying onto the polycarbonate substrate a primer composition containing a thermoplastic acrylic polymer dissolved in a suitable solvent; (ii) evaporating of the solvent to leave a solid thermoplastic acrylic polymer containing primer layer on the polycarbonate substrate; (iii) applying a top-coat composition containing a further-curable organopolysiloxane onto the primed polycarbonate substrate; (iv) evaporating off the volatile solvents present in the top coat composition to form a residue of further-curable organopolysiloxane on the primed polycarbonate substrate; and (v) curing the further-curable organopolysiloxane to form a top coat containing a thermoset organopolysiloxane.

PREFERRED EMBODIMENT OF THE INVENTION

In order that those skilled in the art may better understand how the present invention may be practiced, the following examples are given by way of illustration and not by way of limitation.

EXAMPLE 1

An aromatic polycarbonate is prepared by reacting 2,2-bis(4-hydroxyphenyl) propane and phosgene in the presence of an acid acceptor and a molecular weight regulator and having an intrinsic viscosity of 0.57. The product is then fed to an extruder, which extruder is operated at about 265° C. and the extrudate is comminuted into pellets.

The pellets are then injection molded at about 315° C. into test panels of about 4 in. by 4 in. by about ⅛ in.

thick. The test panels are subjected to an abrasion test. The abrasion test is one wherein test panels having a ⅛ inch diameter hole cut in the center are subjected to a Taber Abraser. The Taber Abraser is equipped with CS-10F wheels which are resurfaced every 200 cycles by abrading for 25 cycles on a S-11 refacing disc. The weights used in combination with the CS-10F wheels are 500 gm. weights. Initial measurements of % Haze are made at four places around the future wear track of the sample using a Gardner Hazemeter. The sample is abraded for 300 cycles, cleaned with isopropanol, and the % Haze is remeasured at the same four places. The four differences in % Haze are calculated and averaged to give the Δ% Haze. The results are set forth in Table 1.

EXAMPLE 2

A thermoplastic acrylic polymer primer composition is prepared by dissolving 5 parts by weight of poly(methyl methacrylate) in 95 parts by weight of a solvent containing 20 parts by weight of ethyleneglycol diacetate and 80 parts by weight of butoxyethanol. This primer composition is flow coated on polycarbonate test panels prepared substantially in accordance with Example 1. Excess primer composition is permitted to drain off and the test panels are dried for 15 minutes at 125° C. The resulting primer layer is 0.02 mils thick.

EXAMPLE 3

A thermoplastic primer layer is deposited on a polycarbonate substrate substantially in accordance with Example 2 except that the thermoplastic acrylic polymer primer composition contains 20 parts by weight of poly(methyl methacrylate) in 80 parts by weight of solvent and the resulting primer layer is 0.47 mils thick.

EXAMPLE 4

To 100 parts by weight of a commercially available solution containing a further-curable organopolysiloxane dissolved in a suitable solvent is added 2 parts by weight of a commercially available curing catalyst solution to form a top-coat composition. This further-curable organopolysiloxane is available from ResartIhm A. G., Mainz, Federal Republic of Germany, as their Resarix SF/PC$^{(R)}$ and is a solution containing about 32 weight percent of a partial hydrolysis and condensation product of methyl triethoxysilane dissolved in an ethanol-tetrahydrofuran-n-butanol-ethoxyethanol solvent system. The catalyst consists of a solution containing 2 weight percent of tetraethylammonium hydroxide dissolved in methanol. Primed polycarbonate panels produced substantially in accordance with Example 2 are flow coated with this top coat composition. Excess top coat composition is permitted to drain off and the test panels are air dried for 30 minutes and are thereafter subjected to 1 hour of heating at 125° C. to cure the further-curable organopolysiloxane. These primed, top coated test panels are then subjected to the above described abrasion test; and an adhesion test which consists of using a multiple blade tool to cut parallel grooves about 1 mm apart through the coating into the substrate, rotating the sample 90° and repeating the cutting process thereby forming a grid pattern of 1 mm squares cut into the coating, and applying an adhesive tape over the cross-hatched area and quickly pulling said tape off (a sample fails the adhesion test if any of the squares in the grid are pulled off). The results obtained from these tests are set forth in Table I.

EXAMPLE 5

To 100 parts by weight of a commercially available silicone solution containing a further-curable organopolysiloxane dissolved in a suitable solvent, i.e., Resarix SF/PC$^{(R)}$, is added 2 parts by weight of a catalyst solution, i.e., a solution containing 2 weight percent of tetraethylammonium hydroxide dissolved in methanol, to form a top-coat composition. Primed polycarbonate panels produced substantially in accordance with Example 3 are flow coated with this top-coat composition. Excess top coat composition is permitted to drain off and the test panels are air dried for 30 minutes and are thereafter subjected to 1 hour of heating at 125° C. to cure the further-curable organopolysiloxane. These primed, top coated test panels are then subjected to the above described adhesion and abrasion tests and the results of these tests are set forth in Table I.

TABLE I

|  | Example 1 | Example 4 | Example 5 |
|---|---|---|---|
| Appearance | — | Smooth, clear | Smooth, clear |
| Adhesion | — | Pass | Pass |
| Δ% Haze, 300 Cycles | 34 | 5.0 | 4.3 |
| Thickness, in mils, of primer layer | — | 0.02 | 0.47 |

EXAMPLE 6

This example is designed to illustrate the criticality of the particular combination of the thermoplastic acrylic polymer primer layer and organopolysiloxane top coat in providing a durable and tenaciously adhered coating effective to produce an abrasion resistant polycarbonate article. Unprimed polycarbonate panels are prepared substantially in accordance with Example 1 and are flow-coated with the Resarix SF/PC$^{(R)}$ organopolysiloxane top coat composition prepared substantially in accordance with Example 3. Excess top coat composition is permitted to drain off and the coated unprimed test panels are air dried for 30 minutes to evaporate the solvent, followed by a one-hour bake at 250° F. to cure the further-curable organopolysiloxane. These unprimed coated test panels are subjected to the aforedescribed adhesion and abrasion tests and the results are set forth in Table II.

TABLE II

| Sample | Adhesion | % Haze, 300 Cycles |
|---|---|---|
| Example 6 | Failed | 10.3 |

As can be seen from Tables I and II, the adhesion of the organopolysiloxane top coat to the unprimed polycarbonate panels is markedly inferior, as a matter of fact, it is unsatisfactory as compared to the adhesion of the organopolysiloxane to the polycarbonate panels primed in accordance with the present invention.

EXAMPLE 7

This example is likewise designed to illustrate the criticality of the particular combination of the thermoplastic acrylic polymer primer layer and organopolysiloxane top coat of the instant invention in providing a durable and tenaciously adhered coating effective to produce an abrasion resistant polycarbonate article. EV-6174, a commercially available thermosettable acrylic (32% solids in butanol) available from Bee Chemical Company, is diluted with n-butanol to various solids concentrations. Into these solutions are dipped polycarbonate test panels prepared substantially in accordance with Example 1. The polycarbonate panels are then removed from the priming solutions and are allowed to remain in the open air for about 30 minutes, during which time the solvent from the priming solutions evaporates and deposits a thin priming film on the polycarbonate surface. The primed test panels are then flow coated with an organopolysiloxane top coat composition of Example 4 substantially in accordance with Example 4. Excess top coat composition is permitted to drain off and the test panels are air dried for 30 minutes and are thereafter subjected to 1 hour of heating at 125° C. These primed and top coated test panels are subjected to the aforedescribed adhesion test and to the abrasion test. The results of these tests, as well as the concentration of the thermosettable acrylic in the primer solution and the thickness of the primer layer are set forth in Table III.

TABLE III

| % Solids (thermosettable acrylic polymer) in n-butanol solution | Primer thickness (mils) | Adhesion | Δ% Haze |
|---|---|---|---|
| 2% | 0.01 | Pass | 7.1 |
| 20% | 0.36 | Marginal* | 7.5 |

*The results of the adhesion test were uneven. That is to say, some samples failed the adhesion test while other samples passed the adhesion test.

A comparison of Tables I and III shows that, with a thermosettable acrylic primer, the abrasion resistance of the top coat, as well as the adhesion of the top coat, deteriorates as the thickness of the primer layer increases. This is not the case with the thermoplastic acrylic primers of the present invention, i.e., the adhesion and abrasion resistance of the top coat do not deteriorate as the thickness of the primer layer increases.

Thus, a particular advantage of the instant thermoplastic acrylic primers is that the abrasion resistance and adhesion of the silicone top coat is generally not a function of primer layer thickness. It is well known to those skilled in the art that wedging occurs during the coating of large polycarbonate sheets. Thus, it is a great advantage if a property such as abrasion resistance is generally not dependent upon primer coating thickness.

A further advantage of having a thick primer coating is that ultraviolet light and other stabilizers can effectively be incorporated in the coating. Polycarbonate generally undergoes photodegradation and turns yellow during prolonged weathering. However, if the surface of polycarbonate can be protected from ultraviolet light, it can be stabilized against photodegradation. Incorporation of ultraviolet light-absorbers in a coating on polycarbonate is therefore highly desirable since these materials will screen ultraviolet light from reaching the surface of the polycarbonate. For practical purposes, however, a coating must generally be about 0.2–0.3 mils thick and contain about 10% of an ultraviolet light-absorber before more than 90% of the incident ultraviolet light can be screened from the surface of the polycarbonate. Thinner primer coatings generally require much more ultraviolet light-absorbers to effectively screen more than 90% of incident ultraviolet light. Due to the fact that the primer layers of the instant invention can be relatively thick, ultraviolet light-absorbers can therefore be effectively incorporated in the thermoplastic acrylic primers of the instant invention.

The foregoing disclosure of this invention is not to be considered as limiting, since many variations may be made by those skilled in the art without departing from the scope or spirit of the foregoing description. For example, although the above examples are limited to only a few of the very many thermoplastic acrylic polymers which can be employed in the present invention, it should be understood that the present invention includes a much broader class of such polymers as shown by formula III and the description preceding these examples.

What we claim as new and desire to secure by Letters Patent of the United States is:

1. A shaped non-opaque coated polycarbonate article having improved mar, scratch, abrasion and chemical solvent resistance comprising a polycarbonate substrate having deposited on the surface thereof (i) an adhesion promoting primer layer consisting essentially of a thermoplastic acrylic polymer; and (ii) a top coat consisting of a thermoset organopolysiloxane disposed on said primer layer, said top coat being tenaciously and uniformly adhered to said polycarbonate substrate by means of said primer layer.

2. The article of claim 1 wherein said thermoplastic acrylic polymer is the polymerization product of at least one compound represented by the general formula $$CH_2=CYCOOR$$

wherein Y represents hydrogen or a methyl radical, and R is an alkyl radical containing from 1 to about 20 carbon atoms.

3. The article of claim 1 wherein said primer layer contains an ultraviolet light absorbent compound.

4. The article of claim 1 wherein said organopolysiloxane is the hydrolysis and condensation product of at least one compound represented by the general formula $$R^2{}_nSiZ_{(4-n)}$$

wherein $R^2$ represents a monovalent hydrocarbon radical, Z represents a hydrolyzable group, and n may vary between 0 and 2.

5. The article of claim 4 wherein $R^2$ is selected from the group consisting of alkyl radicals having from 1 to about 8 carbon atoms, alkenyl radicals having from 2 to about 8 carbon atoms, and a phenyl radical.

6. The article of claim 5 wherein Z represents an —$OR^3$ group wherein $R^3$ is a monovalent hydrocarbon radical and n is 0 or 1.

7. The article of claim 6 wherein $R^3$ is selected from the group consisting of alkyl radicals containing from 1 to about 8 carbon atoms, alkenyl radicals containing from 2 to about 8 carbon atoms, and the phenyl radical.

8. The article of claim 7 wherein $R^2$ is a methyl radical, $R^3$ is an ethyl radical, and n is 1.

9. The article of claim 5 wherein Z represents an —$OCOR^4$ group wherein $R^4$ is a monovalent hydrocarbon radical.

10. The article of claim 9 wherein $R^4$ is selected from the group consisting of alkyl radicals containing from 1 to about 8 carbon atoms, alkenyl radicals containing from 2 to about 8 carbon atoms, and the phenyl radical.

11. The article of claim 6 wherein $R^2{}_nSiZ_{(4-n)}$ is an alkyltrialkoxysilane.

12. The article of claim 1 wherein said primer layer includes an ultraviolet light absorbent compound.

13. The article of claim 11 wherein said primer layer includes an ultraviolet light absorbent compound.

14. A shaped non-opaque coated polycarbonate article having improved mar, scratch, abrasion and chemical solvent resistance comprising a polycarbonate substrate having deposited on at least one surface thereof (i) an adhesion promoting primer layer consisting essentially of (a) a thermoplastic acrylic polymer, and (b) at least one ultraviolet light absorber; and, (ii) a top coat consisting of a thermoset organopolysiloxane disposed on said primer layer.

15. The article of claim 14 wherein said thermoplastic acrylic polymer is comprised of the polymerization product of at least one compound represented by the general formula $$CH_2=CYCOOR$$

wherein Y represents hydrogen or a methyl radical, and R is an alkyl radical containing from 1 to about 20 carbon atoms.

16. A shaped non-opaque coated polycarbonate article having improved mar, scratch, abrasion and chemical solvent resistance comprising a polycarbonate substrate having deposited on at least one surface thereof (i) an adhesion promoting primer layer consisting of a thermoplastic acrylic polymer; and (ii) a top coat containing a thermoset organopolysiloxane disposed on said primer layer.

17. The article of claim 16 wherein said thermoplastic acrylic polymer is comprised of the polymerization product of at least one compound represented by the general formula $$CH_2=CYCOOR$$

wherein Y represents hydrogen or a methyl radical, and R is an alkyl radical containing from 1 to about 20 carbon atoms.

18. A shaped non-opaque coated polycarbonate article having improved mar, scratch, abrasion and chemical solvent resistance comprising a polycarbonate substrate having deposited on at least one surface thereof (i) an adhesion promoting primer layer consisting of (a) a thermoplastic acrylic polymer, and (b) at least one ultraviolet light absorber; and (ii) a top coat consisting of a thermoset organopolysiloxane disposed on said primer layer.

19. The article of claim 18 wherein said thermoplastic acrylic polymer is comprised of the polymerization product of at least one compound represented by the general formula $$CH_2=CYCOOR$$

wherein Y represents hydrogen or a methyl radical, and R is an alkyl radical containing from 1 to about 20 carbon atoms.

* * * * *